(12) United States Patent
Curtis et al.

(10) Patent No.: US 10,428,824 B2
(45) Date of Patent: Oct. 1, 2019

(54) SYSTEMS AND METHODS FOR SPEED CONTROL OF AN AIR MOVER

(75) Inventors: Robert Curtis, Georgetown, TX (US); Chris E. Peterson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 749 days.

(21) Appl. No.: 13/532,121

(22) Filed: Jun. 25, 2012

(65) Prior Publication Data
US 2013/0343916 A1    Dec. 26, 2013

(51) Int. Cl.
F04D 27/00    (2006.01)
F04D 25/06    (2006.01)

(52) U.S. Cl.
CPC ....... F04D 25/0613 (2013.01); F04D 27/004 (2013.01)

(58) Field of Classification Search
CPC .............. F04D 29/584; F04D 29/5806; F04D 29/5813; F04D 25/06; F04D 25/0633; F04D 25/0666; F04D 25/08; F04D 27/004; F04B 49/06; F04B 49/065; F04B 49/103; F04B 49/20; F04B 2203/0201–0202; F04B 2203/0209; F04B 2203/0212
USPC ..................................................... 417/42, 45
See application file for complete search history.

(56) References Cited

U.S. PATENT DOCUMENTS

| | | | |
|---|---|---|---|
| 4,164,690 A * | 8/1979 | Muller ................ | F04D 25/0653 310/63 |
| 5,019,757 A * | 5/1991 | Beifus ................. | F04D 27/004 318/400.07 |
| 5,080,496 A * | 1/1992 | Keim ................... | F02C 9/28 374/144 |
| 5,557,182 A * | 9/1996 | Hollenbeck .......... | F23N 1/062 318/400.13 |
| 5,825,972 A | 10/1998 | Brown ................. | 388/811 |
| 6,016,965 A * | 1/2000 | Yoshimura et al. .. | 236/35 |
| 6,593,717 B2 * | 7/2003 | Yoshimura ........... | 318/471 |
| 6,674,257 B2 | 1/2004 | Xi ........................ | 318/254 |
| 6,762,577 B2 | 7/2004 | Gray et al. ........... | 318/268 |
| 6,779,981 B2 * | 8/2004 | Huang et al. ........ | 417/42 |
| 6,824,362 B2 | 11/2004 | Dodson, III ......... | 417/22 |
| 6,996,333 B1 | 2/2006 | Lin ....................... | 388/800 |
| 7,249,718 B2 * | 7/2007 | Beitelmal et al. ... | 236/49.3 |
| 7,495,402 B2 | 2/2009 | Lee ...................... | 318/400.01 |
| 8,519,857 B2 * | 8/2013 | Homer et al. ....... | 340/635 |
| 2005/0030171 A1 * | 2/2005 | Liu et al. ............ | 340/500 |
| 2010/0194321 A1 * | 8/2010 | Artman et al. ...... | 318/454 |
| 2010/0256821 A1 * | 10/2010 | Jeung et al. ......... | 700/276 |
| 2011/0057590 A1 * | 3/2011 | Flanary ............... | F04B 49/106 318/400.13 |

(Continued)

*Primary Examiner* — Essama Omgba
*Assistant Examiner* — Charles W Nichols
(74) *Attorney, Agent, or Firm* — Jackson Walker L.L.P.

(57) ABSTRACT

In accordance with embodiments of the present disclosure, a system may include a rotational component for moving air, a speed sensor, an electrical draw sensor, and a controller. The speed sensor may configured to determine a speed of the rotational component. The electrical draw sensor may be configured to determine an electrical draw of the air mover. The controller may be communicatively coupled to the rotational component, the speed sensor, and the electrical draw sensor, and may be configured to control the speed of the rotational component based on the speed and the electrical draw.

18 Claims, 5 Drawing Sheets

(56) References Cited

U.S. PATENT DOCUMENTS

2013/0293167 A1* 11/2013 Harris, III ................ H02P 5/50
318/400.13

* cited by examiner

SYSTEMS AND METHODS FOR SPEED CONTROL OF AN AIR MOVER

TECHNICAL FIELD

The present disclosure relates in general to information handling systems, and more particularly controlling the speed of an air mover (e.g., a fan or a blower) associated with an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Among the disadvantages associated with traditional air movers are the acoustical noise generated by such devices. In traditional air movers, speed variation at lower operating speeds may vary greatly (e.g., in the range of 15-20%). The speed variation may be attributable to many factors, including without limitation electrical resistance in air mover circuitry (e.g., of a coil winding), magnetization of magnetic components of the air mover, dimensions of structural components of the air mover, physical characteristics of a speed sensor of the air mover (e.g., Hall effect sensor), speed control circuit design, and/or other factors. Testing of traditional air movers has shown that the intensity of sound produced is a function of the fifth power of fan speed and a function of the seventh power of blower speed. Thus, even with a constant input control value, high variance in air mover speeds may yield very different and inconsistent acoustical signatures from fan to fan and thus system to system.

SUMMARY

In accordance with the teachings of the present disclosure, the disadvantages and problems associated with cooling an information system and components thereof may be substantially reduced or eliminated.

In accordance with embodiments of the present disclosure, a system may include a rotational component for moving air, a speed sensor, an electrical draw sensor, and a controller. The speed sensor may be configured to determine a speed of the rotational component. The electrical draw sensor may be configured to determine an electrical draw of the air mover. The controller may be communicatively coupled to the rotational component, the speed sensor, and the electrical draw sensor, and may be configured to control the speed of the rotational component based on the speed and the electrical draw.

In accordance with these and other embodiments of the present disclosure, an information handling system may include a processor and an air mover. The air mover may include a rotational component for moving air, a speed sensor, an electrical draw sensor, and a controller. The speed sensor may be configured to determine a speed of the rotational component. The electrical draw sensor may be configured to determine an electrical draw of the air mover. The controller may be communicatively coupled to the processor, the rotational component, the speed sensor, and the electrical draw sensor, and may be configured to control the speed of the rotational component based on the speed and the electrical draw.

In accordance with these and other embodiments of the present disclosure, a method may include receiving an input signal indicative of a desired speed for a rotational component of an air mover. The method may also include determining a maximum electrical draw based on the input signal. The method may further include limiting the speed of the rotational component such that an electrical draw is less than the maximum electrical draw.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, integrated circuit packages; electro-mechanical devices (e.g., air movers), displays, and power supplies.

Figure 1:
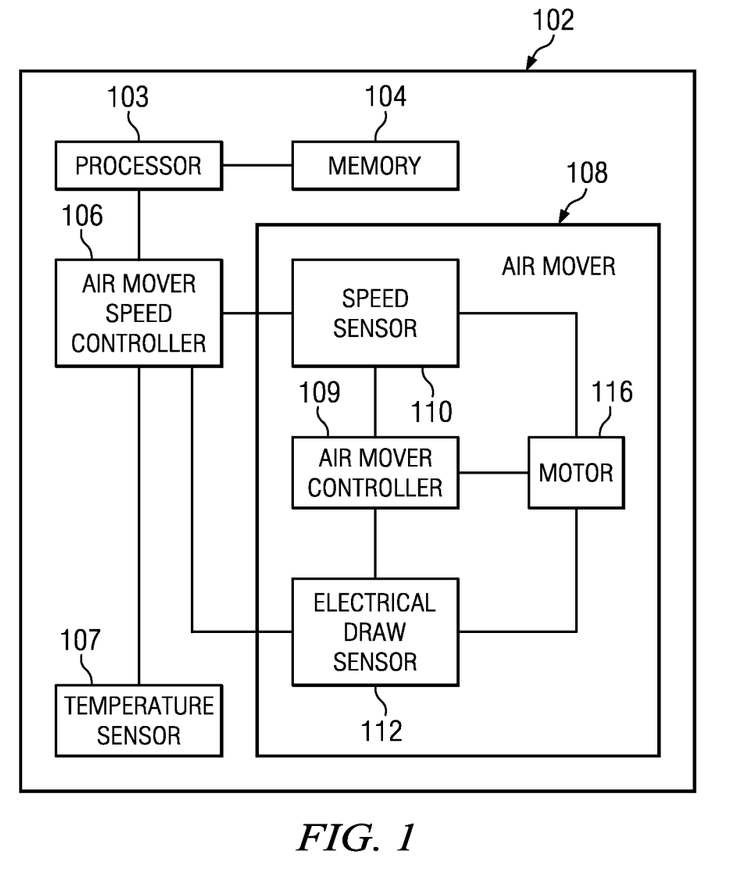
FIG. 1 illustrates a block diagram of an example information handling system, in accordance with the present disclosure.

FIG. 1 illustrates a block diagram of an example information handling system 102, in accordance with the present disclosure. In some embodiments, an information handling system 102 may comprise a server chassis configured to house a plurality or servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104, a fan speed controller 106, and an air mover 108.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover speed controller 106 may be communicatively coupled to processor 103 and may include any system, device, or apparatus configured to receive a signal indicative of a temperature within information handling system 102 (e.g., a signal from temperature sensor 107) and based on such signal, calculate an air mover speed to maintain an appropriate level of cooling, increase cooling, or decrease cooling, as appropriate, while also minimizing air mover speed for minimum power consumption.

A temperature sensor 107 may be any system, device, or apparatus (e.g., a thermometer, thermistor, etc.) configured to communicate a signal to air mover speed controller 106 indicative of a temperature within information handling system 102.

Air mover 108 may be communicatively coupled to air mover speed controller 106, and may include any mechanical or electro-mechanical system, apparatus, or device operable to move air and/or other gasses. In some embodiments, air mover 108 may comprise a fan (e.g., a rotating arrangement of vanes or blades which act on the air). In other embodiments, air mover 108 may comprise a blower (e.g. centrifugal fan that employs rotating impellers to accelerate air received at its intake and change the direction of the airflow). In these and other embodiments, rotating and other moving components of air mover 108 may be driven by a motor 116. In operation, air mover 108 may cool information handling resources of information handling system 102 by drawing cool air into a chassis housing the information handling resources from the outside the chassis, expel warm air from inside the chassis to the outside of such chassis, and/or move air across one or more heatsinks (not explicitly shown) internal to the chassis to cool one or more information handling resources. As shown in FIG. 1, air mover 108 may include an air mover controller 109, a speed sensor 110, an electrical draw sensor, and a motor 116.

Air mover controller 109 may include any system, device, or apparatus configured to receive an input control signal (e.g., air mover speed controller 106) and signals indicative of a speed of air mover 108 and an electrical draw of air mover 108, and based on such signals, control the speed of motor 116, as is described in greater detail below with respect to FIG. 2.

Speed sensor 110 may be communicatively coupled to air mover controller 109 and motor 116, and may include any system, device, or apparatus capable of sensing the speed (e.g., revolutions per minute) of a rotational component of air mover 108 (e.g., fan, rotor, impeller, motor, etc.) and communicating a signal indicative of such sensed speed to air mover controller 109. In some embodiments, speed sensor 110 may comprise a Hall effect sensor (e.g., a transducer that varies its output voltage in response to a magnetic field, such magnetic field created by a magnetic element present in air mover 108).

Electrical draw sensor 112 may be communicatively coupled to air mover controller 109 and motor 116, and may include any system, device, or apparatus capable of sensing an electrical draw (e.g., current, power, and/or other parameter) of air mover 108 and communicating a signal indicative of such sensed electrical draw to air mover controller 109. In some embodiments, such electrical draw sensor 112 may comprise a shunt resistor.

Figure 2:
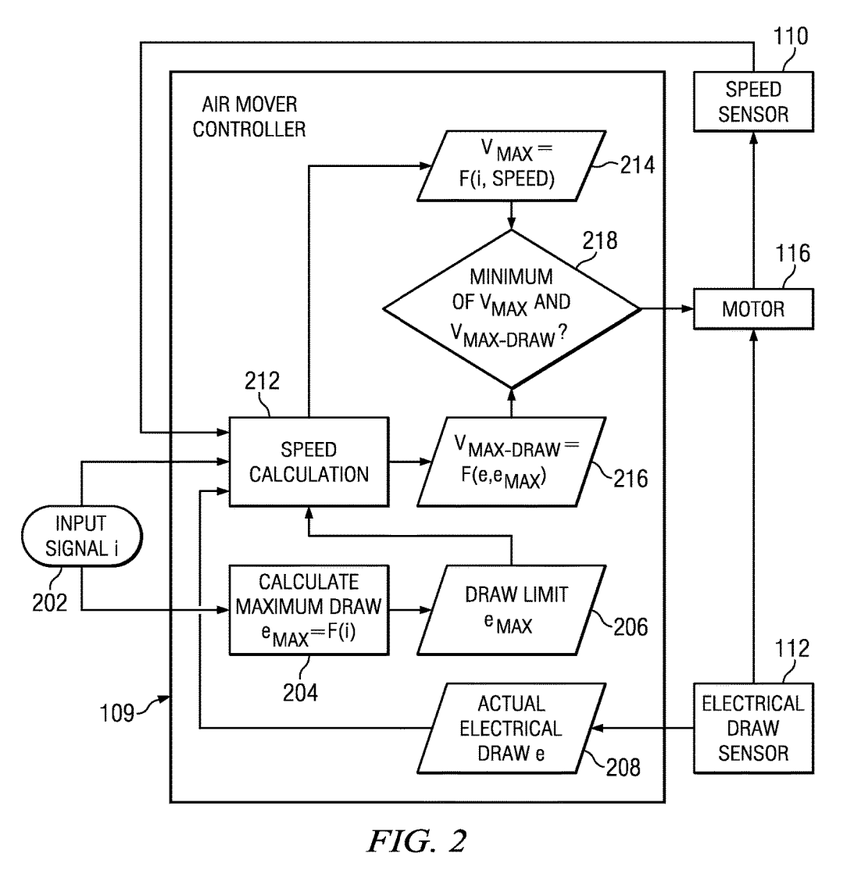
FIG. 2 illustrates a flow diagram depicting a method for controlling speed of an air mover, in accordance with the present disclosure.

FIG. 2 illustrates a flow diagram depicting a method for controlling speed of air mover 108 performed by various components of information handling system 102, in accordance with the present disclosure. As shown in FIG. 2, in block 202 an input signal i indicative of a desired operating speed for air mover 108 may be received by air mover controller 109. Such signal i may be communicated from, for example, air mover speed controller 106 or another suitable component of information handling system 102. In some embodiments, signal i may comprise a pulse-width modulation (PWM) signal, in which the width of a pulse of a periodic square wave signal may be indicative of the desired operating speed.

As shown in blocks 204 and 206, air mover controller 109 may calculate a maximum electrical draw $e_{max}$ based the input signal i. In some embodiments, the relationship between $e_{max}$ and i may be monotonically increasing such that as i increases (e.g., the pulse width of i increases) so does $e_{max}$.

As shown in block 208, electrical draw sensor 112 may determine the actual electrical draw e (e.g., current, power, or other parameter) of air mover 108 (e.g., an electrical draw of motor 116) and communicate to controller air mover controller 109 a signal indicative of such actual electrical draw e.

At block 212, air mover controller 109 may generate two signals indicative of voltage or other electrical parameter to be communicated to motor 116. As shown in block 214, one signal $v_{max}$ may be calculated based on input signal i and a signal indicative of the actual speed of motor 116 as determined by and communicated from speed sensor 110. Such signal $v_{max}$ may be indicative of an operating voltage to be applied to motor 116 in the absence of any electrical draw limit. In some embodiments, the relationship between $v_{max}$ and i may be monotonically increasing such that as i increases (e.g., the pulse width of i increases) so does $v_{max}$.

As shown in block 216, another signal $V_{max-draw}$, which may be indicative of a maximum operating voltage to be applied to motor 116 in order to maintain an actual electrical draw e below the electrical draw limit $e_{max}$, may be calculated based on the actual electric draw e and the electrical draw limit $e_{max}$. For example, air mover controller 109 may compare the actual electrical draw e to the maximum electrical draw $e_{max}$. If the actual electrical draw e is less than the maximum electrical draw $e_{max}$, controller may increase the signal $V_{max-draw}$. On the other hand, if the actual electrical draw e is greater than the maximum electrical draw $e_{max}$, controller may decrease the signal $V_{max-draw}$.

As shown in block 218, air mover controller 109 may determine the minimum of $v_{max}$ and $V_{max-draw}$, and communicate such signal to motor 116 as indicative of the operating voltage for motor 116. Thus, air mover 109 may provide a closed loop control system that limits the electrical draw of air mover 108 to a maximum electrical draw. Advantageously, such electrical draw limit may reduce consumption of power at a particular speed and/or input signal i. In addition, the closed loop nature of control may reduce the range of operating speed variation occurring at lower speeds. Such advantages are discussed below with reference to FIGS. 3-5.

Figure 3:
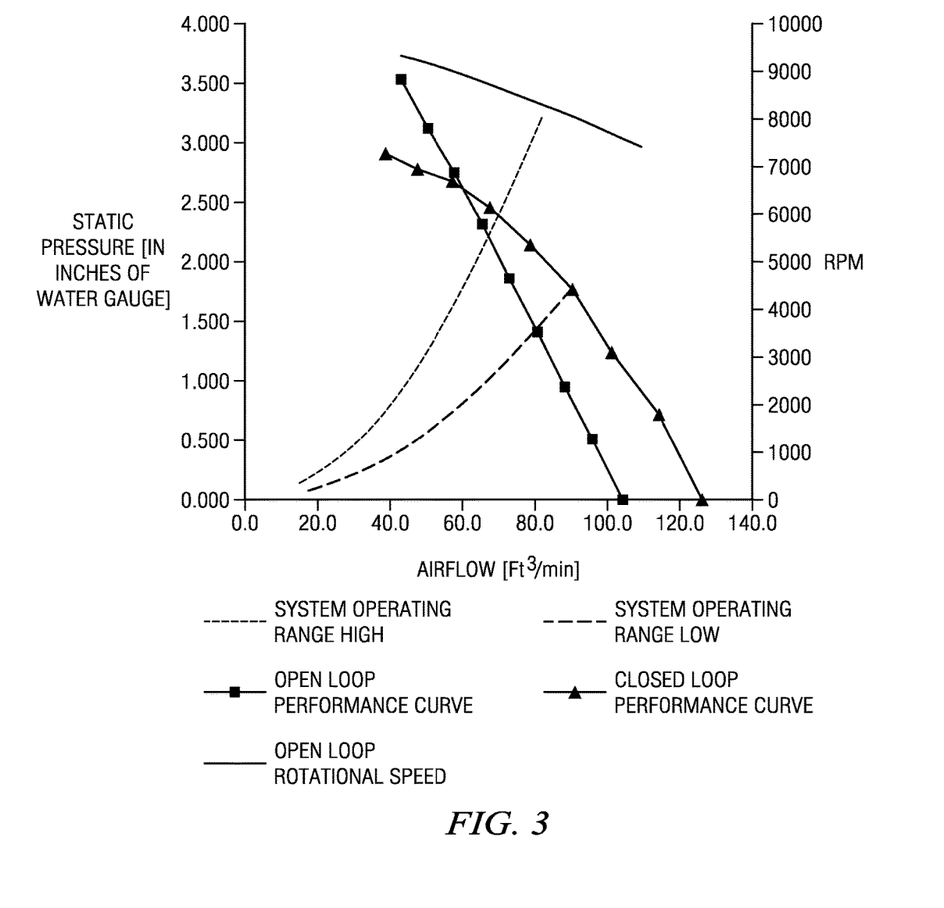
FIGS. 3 and 4 each illustrate a graph depicting experimental performance characteristics of an example closed loop air mover system and an example open loop air mover system, in accordance with the present disclosure.

FIG. 3 illustrates experimental data points obtained from laboratory simulation of a particular air mover module at a particular pulse width of input signal i in each of a closed loop and open loop configuration. The primary y-axis depicts static pressure of an example system (e.g., computer chassis) in which testing was performed, the secondary y-axis depicts air mover rotational speed in revolutions per minute, and the x-axis depicts airflow induce by the example air mover in cubic feet per minute. Dashed lines represent a range of pressure (e.g., system impedance) that the example air mover module would experience in the particular example system (e.g., computer chassis).

As seen in FIG. 3, rotational speed increases as system static pressure increases (e.g., as seen by the plot with data points represented by squares). To reduce the variance in rotational speed, a closed loop control may be implemented, in which the closed loop control attempts to maintain the rotational speed at a constant level for a given input signal i. In the example depicted in FIG. 3, a maximum rotational speed for the input signal i may be selected as 8500 RPM. Such rotational speed may be selected such that the operating range of the closed loop air mover system is within the system operating range represented by the two dashed lines. With such RPM, the closed loop performance would not drop below the performance of the open loop air mover. An example performance curve of the closed loop system is shown by the plot with data points represented by triangles.

Figure 4:
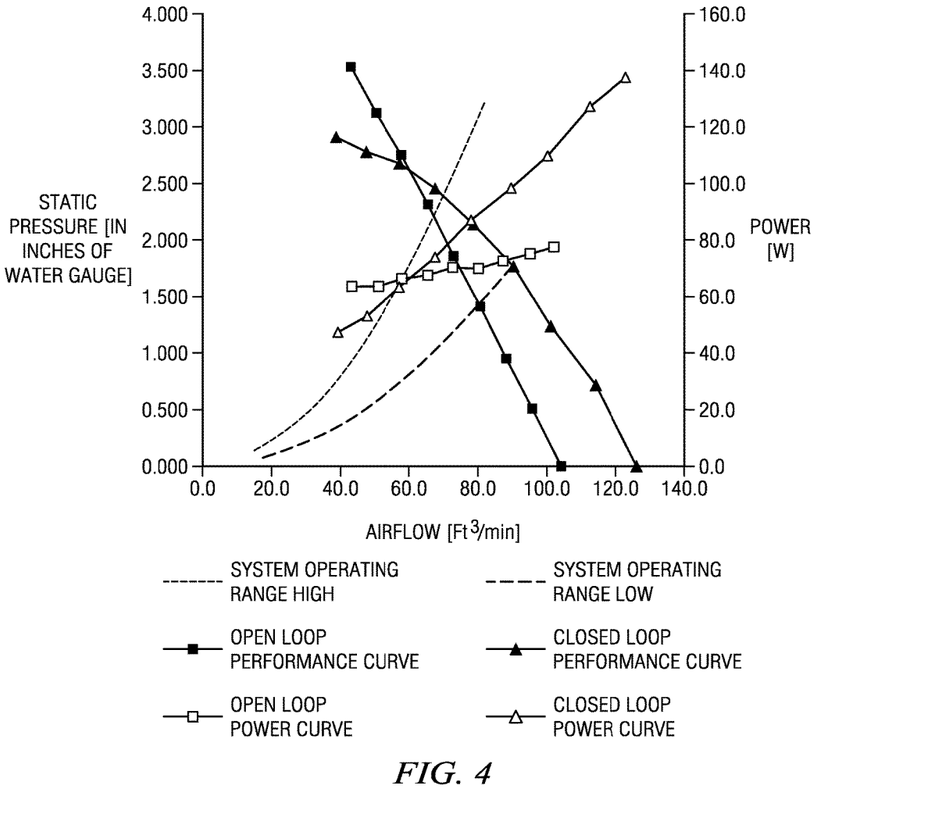
Figure 5:
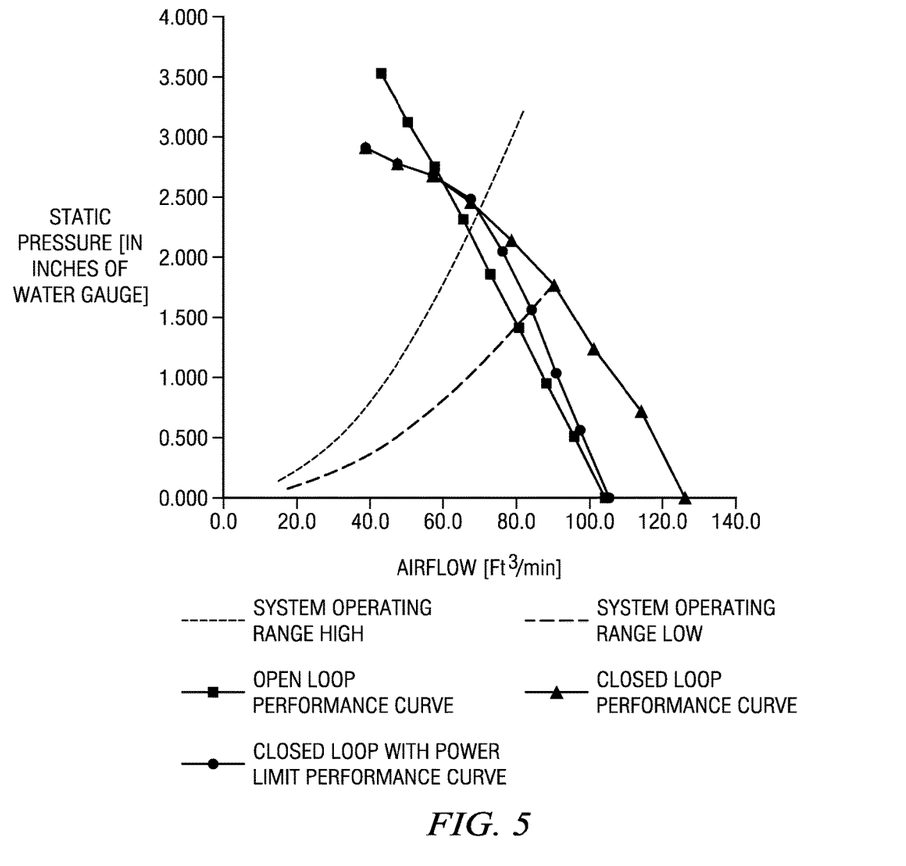
FIG. 5 illustrates a graph depicting experimental performance characteristics of an example closed loop air mover system, an example open loop air mover system, and the air mover system depicted in FIG. 2, in accordance with the present disclosure.

In addition to a shift in the performance curve, as shown in FIG. 3, another consequence of the air mover operating at a fixed rotational speed is an increase in power consumption, as shown in FIG. 4, which depicts power consumption (on the secondary y-axis) versus airflow. However, due to the higher rotational speed at lower pressures, the performance (e.g., airflow delivery) is increased in the closed loop system compared to the open loop system, even though such increased performance may not be needed at low pressures. Accordingly, in addition to the rotational speed limit applied by the system depicted in FIG. 2, a power limit may also be applied to reduce performance at lower pressures to approximately that of the open loop system. The power selected as the power limit may be the maximum power of the air mover for a given input signal i. An example pressure versus airflow for a closed loop system with a rotational speed limit and power limit (e.g., the system of FIG. 2) is shown in FIG. 5 as the plot with data points represented by circles. Thus, with the system depicted in FIG. 2, variation in rotational speed is reduced as compared to the open loop system, but power draw is maintained at the same levels as the open loop system.

The electrical draw limit can be customized and/or tuned so that the resultant performance curve shown in FIG. 5 (represented by circles) can be matched to the open loop curve. The electrical draw limit for the example shown used the maximum power for the curve shown whereas the power could have been limited to a lesser value more applicable to the operating range between the two dashed lines.

Although the present disclosure has been described in detail, it should be understood that various changes, substitutions, and alterations can be made hereto without departing from the spirit and the scope of the disclosure as defined by the appended claims.

What is claimed is:
1. An information handling system, comprising:
   a processor;
   a temperature sensor configured to generate a temperature signal indicative of a temperature within the information handling system;
   a first controller, communicatively coupled to the processor, configured to:
      receive the temperature signal; and
      generate, in accordance with the temperature signal, a desired speed signal corresponding to a desired speed for a motor, wherein the motor is configured to:
         receive an operating signal; and
         drive, in accordance with the operating signal, a rotational component of an air mover;
   wherein the air mover includes:
      a motor
      a speed sensor configured to generate an actual speed signal indicative of an actual speed of the motor;

an electrical draw sensor configured to generate an electrical draw signal indicative of an actual electrical draw of the motor; and an air mover controller configured to:
receive input signals, wherein the input signals include the actual speed signal, the electrical draw signal, and the desired speed signal; and perform air mover control operations to generate, in accordance with the input signals, the operating signal, wherein the air mover control operations include:
determining, based on the desired speed signal and the actual speed signal, a first speed signal corresponding to a first speed;
determining, based on the desired speed signal, an electrical draw limit;
determining, based on the electrical draw signal and the electrical draw limit, a second speed signal corresponding to a second speed; and
selecting either the first speed signal or the second speed signal as the operating signal.

2. The information handling system of claim 1, wherein the desired speed signal comprises a pulse width modulated signal and wherein a pulse width of the pulse width modulated signal indicates the desired speed.

3. The information handling system of claim 1, wherein the air mover comprises either a fan or a blower.

4. The information handling system of claim 1, wherein the actual electrical draw indicates an actual current draw of the rotational component.

5. The information handling system claim 1, wherein the first speed signal is associated with a first voltage, the second speed signal is associated with a second voltage, and wherein the selecting of either the first speed signal or the second speed signal comprises selecting the first speed signal unless the second voltage is lower than the first voltage.

6. The information handling system of claim 1, wherein the second speed signal indicates a maximum operating voltage at which the actual electrical draw does not exceed the electrical draw limit.

7. The information handling system of claim 1, wherein the selecting either the first speed signal or the second speed signal as the operating signal comprises selecting the first speed signal responsive to determining that the first speed is lower than the second speed.

8. The information handling system of claim 1, wherein the speed sensor comprises a Hall-effect transducer configured to generate an output voltage responsive to detecting a magnetic field created by a magnetic element of the air mover.

9. A method comprising:
receiving, by an air mover controller of an information handling system, input signals, wherein the input signals include:
an actual speed signal indicative of an actual speed of a motor configured to receive an operating signal and further configured to drive, in accordance with the operating signal, a rotational component of an air mover in the information handling system;
an electrical draw signal indicative of an actual electrical draw of the motor; and
a desired speed signal indicative of a desired operating speed for the motor;

receiving a temperature signal indicative of an actual temperature associated with the information handling system; and generating the desired speed signal based on the temperature signal;
determining, based on the desired speed signal and the actual speed signal, a first speed signal corresponding to a first operating speed for the motor;
determining, based on the desired speed signal, an electrical draw limit;
determining, based on the electrical draw signal and the electrical draw limit, a second speed signal corresponding to a second operating speed for the motor;
selecting the first speed signal as the operating signal for the motor responsive to determining the first operating speed is less than the second operating speed; and
selecting the second speed signal as the operating signal responsive to determining the second operating speed is less than the first operating speed.

10. The method of claim 9, wherein the desired speed signal comprises a pulse width modulated signal and wherein a pulse width of the pulse width modulated signal indicates the desired operating speed.

11. The method of claim 9, wherein the air mover comprises either a fan or a blower.

12. The method of claim 9, wherein the actual electrical draw indicates an actual current draw of the rotational component.

13. The method of claim 9, wherein the second speed signal indicates a maximum operating voltage at which the actual electrical draw does not exceed with the electrical draw limit.

14. The method of claim 9, wherein receiving the actual speed signal comprises:
receiving an output voltage generated by a Hall-effect transducer responsive to detecting a magnetic field created by a magnetic element of the air mover.

15. An air mover controller of an information handling system, wherein the air mover controller is configured to receive input signals, wherein the input signals include:
an actual speed signal indicative of an actual speed of a motor configured to receive an operating signal and further configured to drive, in accordance with the operating signal, a rotational component of an air mover in the information handling system;
an electrical draw signal indicative of an actual electrical draw of the motor;
wherein the information handling system is configured to receive a temperature signal from a temperature sensor indicative of an actual temperature associated with the information handling system; and generate, in accordance with the temperature signal, a desired speed signal corresponding to a desired speed for a motor;
wherein, the air mover controller is configured to perform air mover control operations, wherein the air mover control operations include:
determining, based on the desired speed signal and the actual speed signal, a first speed signal corresponding to a first operating speed for the motor;
determining, based on the desired speed signal, an electrical draw limit;
determining, based on the electrical draw signal and the electrical draw limit, a second speed signal corresponding to a second operating speed for the motor;
selecting the first speed signal as the operating signal for the motor responsive to determining the first operating speed is less than the second operating speed; and selecting the second speed signal as the operating signal responsive to determining the second operating speed is less than the first operating speed.

16. The air mover controller of claim 15, wherein the desired speed signal comprises a pulse width modulated signal and wherein a pulse width of the pulse width modulated signal indicates the desired operating speed.

17. The air mover controller of claim 15, wherein the actual electrical draw indicates an actual current draw of the rotational component.

18. The air mover controller of claim 15, wherein the actual speed signal comprises an output of a Hall-effect transducer configured to generate a voltage responsive to detecting a magnetic field created by a magnetic element of the air mover.

* * * * *